US012701052B1

(12) United States Patent
Deng et al.

(10) Patent No.: US 12,701,052 B1
(45) Date of Patent: Aug. 4, 2026

(54) AUTOMATED NETWORK DISCOVERY, SECURE NETWORK COMMUNICATIONS, AND AUTOMATED NETWORK CONFIGURATION

(71) Applicant: Calix, Inc., San Jose, CA (US)

(72) Inventors: Tian Deng, Nanjing (CN); Wei Miao, Nanjing (CN); Youwu Tu, Nanjing (CN)

(73) Assignee: Calix, Inc, San Jose, CA (US)

( * ) Notice: Subject to any disclaimer, the term of this patent is extended or adjusted under 35 U.S.C. 154(b) by 29 days.

(21) Appl. No.: 18/891,979

(22) Filed: Sep. 20, 2024

(51) Int. Cl.
　　*H04L 41/12* 　　(2022.01)
　　*H04L 9/40* 　　(2022.01)
　　*H04L 41/084* 　　(2022.01)
(52) U.S. Cl.
　　CPC .......... *H04L 41/12* (2013.01); *H04L 41/0843* (2013.01); *H04L 63/0823* (2013.01)
(58) Field of Classification Search
　　None
　　See application file for complete search history.

(56) References Cited

U.S. PATENT DOCUMENTS

| | | | |
|---|---|---|---|
| 2007/0050240 A1* | 3/2007 | Belani ...................... | G08G 1/14 705/13 |
| 2007/0268913 A1* | 11/2007 | Denecheau ......... | H04L 12/4641 370/397 |
| 2011/0072101 A1* | 3/2011 | Forssell ................ | H04W 48/18 709/206 |
| 2013/0201874 A1* | 8/2013 | Chen ..................... | H04L 61/103 370/255 |
| 2014/0215580 A1* | 7/2014 | Behringer ............. | H04L 63/105 726/5 |
| 2015/0135299 A1* | 5/2015 | Liang .................. | H04L 63/0823 726/10 |
| 2019/0199626 A1* | 6/2019 | Thubert .................. | H04L 47/19 |
| 2021/0008457 A1* | 1/2021 | Schouviller ............. | A63F 13/71 |
| 2023/0188562 A1* | 6/2023 | Cremon ............. | H04L 63/0428 713/151 |
| 2023/0239287 A1* | 7/2023 | Sinha .................... | H04L 63/166 726/6 |

* cited by examiner

*Primary Examiner* — Raqiul A Choudhury
(74) *Attorney, Agent, or Firm* — Patterson + Sheridan, LLP

(57) ABSTRACT

The disclosure provides an approach for automated network discovery. Embodiments include generating and propagate a token containing identity information and a digital signature. Embodiments include receiving neighbor reports from a plurality of network nodes in response to the token, wherein each neighbor report includes neighbor relationship information, network status information, a device type, and a device identifier. Embodiments include constructing and maintaining a network topology based on the received neighbor reports.

16 Claims, 12 Drawing Sheets

100

200

Central Control Node 112

402 — Token with Topology Discovery Request

Network Element 114₁

404 — Validate Signature

406 — Report Neighbor Information

408 — Forward Token with Topology Discovery Request

414 — Forward Neighbor Information

416 — Generate/Update Topology

Network Element 114₂

410 — Validate Signature

412 — Report Neighbor Information

400

Certificate Authority 650

Network Element 114₁

Get Root Certificate 602

Store Root Certificate in Trust Store 604

Generate Key Pair 610

Send Certificate Signing Request 614

Send Signed Certificate 616

Send Signed Certificate 620

Network Element 114₂

Get Root Certificate 606

Store Root Certificate in Trust Store 608

Generate Key Pair 612

Send Certificate Signing Request 618

Establish Secure Channel Based on Certificates and Keys 622

Figure 9:
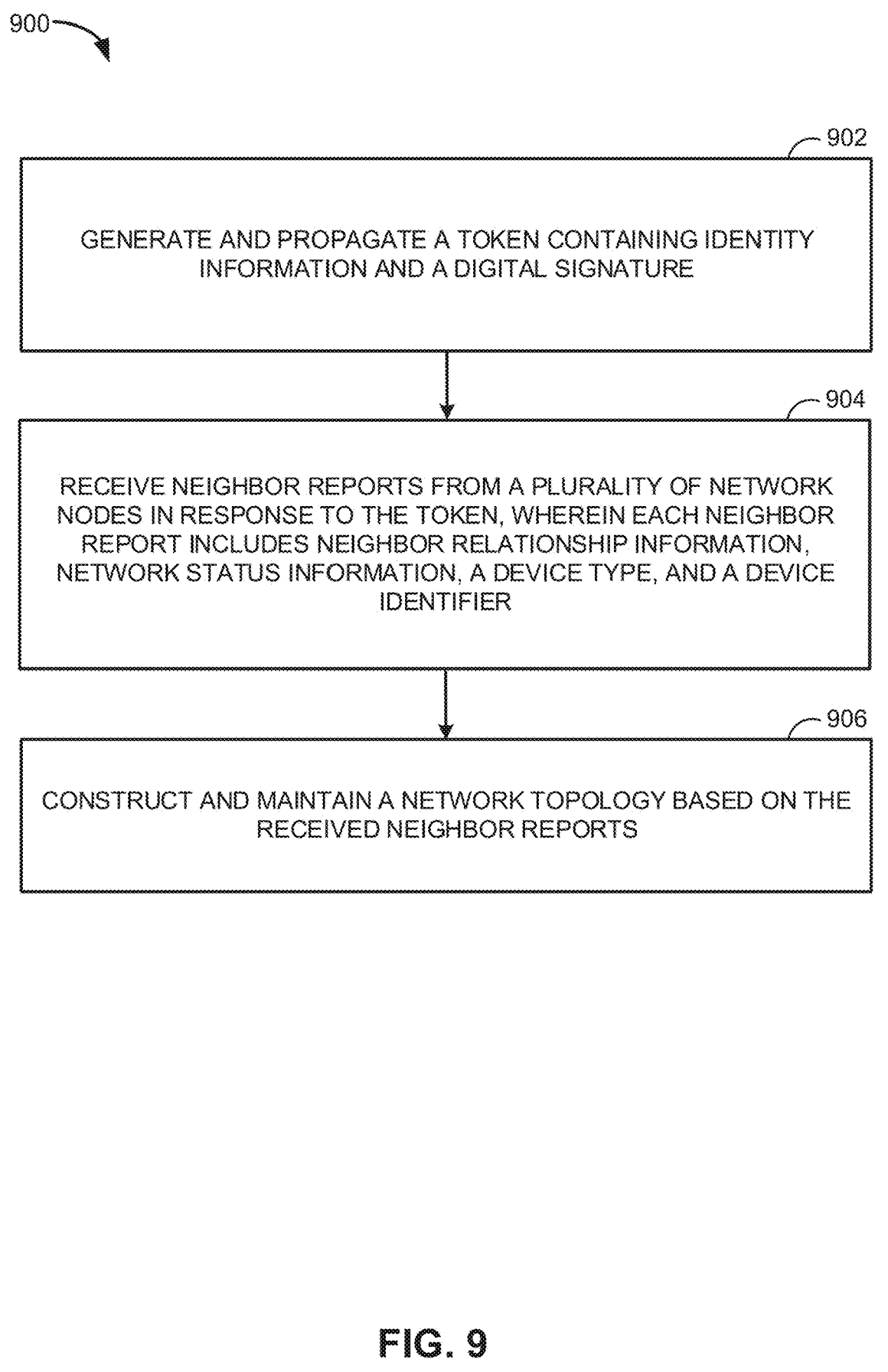

GENERATE AND PROPAGATE A TOKEN CONTAINING IDENTITY INFORMATION AND A DIGITAL SIGNATURE

904

RECEIVE NEIGHBOR REPORTS FROM A PLURALITY OF NETWORK NODES IN RESPONSE TO THE TOKEN, WHEREIN EACH NEIGHBOR REPORT INCLUDES NEIGHBOR RELATIONSHIP INFORMATION, NETWORK STATUS INFORMATION, A DEVICE TYPE, AND A DEVICE IDENTIFIER

906

CONSTRUCT AND MAINTAIN A NETWORK TOPOLOGY BASED ON THE RECEIVED NEIGHBOR REPORTS

Figure 10:
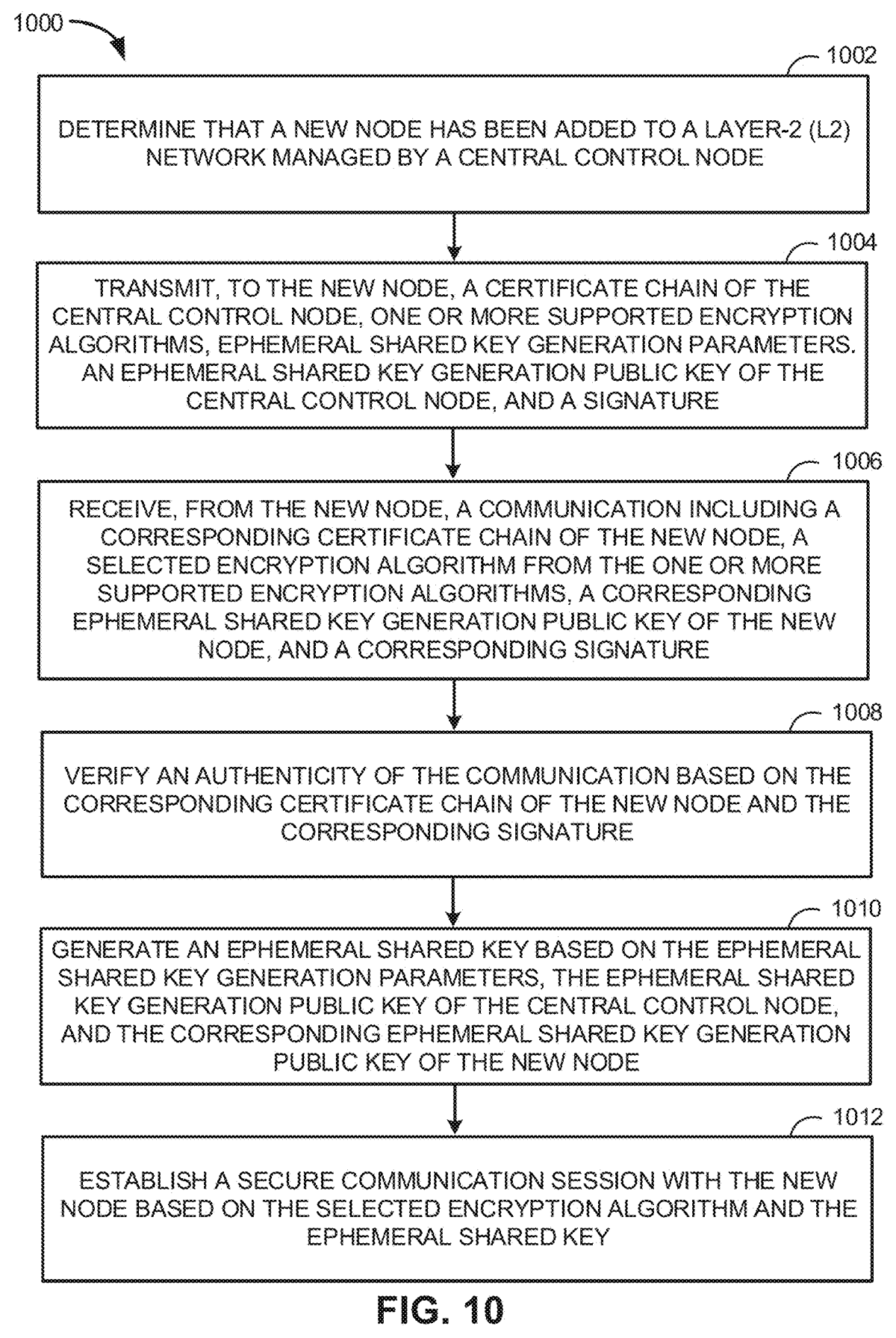

DETERMINE THAT A NEW NODE HAS BEEN ADDED TO A LAYER-2 (L2) NETWORK MANAGED BY A CENTRAL CONTROL NODE

1004

TRANSMIT, TO THE NEW NODE, A CERTIFICATE CHAIN OF THE CENTRAL CONTROL NODE, ONE OR MORE SUPPORTED ENCRYPTION ALGORITHMS, EPHEMERAL SHARED KEY GENERATION PARAMETERS. AN EPHEMERAL SHARED KEY GENERATION PUBLIC KEY OF THE CENTRAL CONTROL NODE, AND A SIGNATURE

1006

RECEIVE, FROM THE NEW NODE, A COMMUNICATION INCLUDING A CORRESPONDING CERTIFICATE CHAIN OF THE NEW NODE, A SELECTED ENCRYPTION ALGORITHM FROM THE ONE OR MORE SUPPORTED ENCRYPTION ALGORITHMS, A CORRESPONDING EPHEMERAL SHARED KEY GENERATION PUBLIC KEY OF THE NEW NODE, AND A CORRESPONDING SIGNATURE

1008

VERIFY AN AUTHENTICITY OF THE COMMUNICATION BASED ON THE CORRESPONDING CERTIFICATE CHAIN OF THE NEW NODE AND THE CORRESPONDING SIGNATURE

1010

GENERATE AN EPHEMERAL SHARED KEY BASED ON THE EPHEMERAL SHARED KEY GENERATION PARAMETERS, THE EPHEMERAL SHARED KEY GENERATION PUBLIC KEY OF THE CENTRAL CONTROL NODE, AND THE CORRESPONDING EPHEMERAL SHARED KEY GENERATION PUBLIC KEY OF THE NEW NODE

1012

ESTABLISH A SECURE COMMUNICATION SESSION WITH THE NEW NODE BASED ON THE SELECTED ENCRYPTION ALGORITHM AND THE EPHEMERAL SHARED KEY

Figure 11:
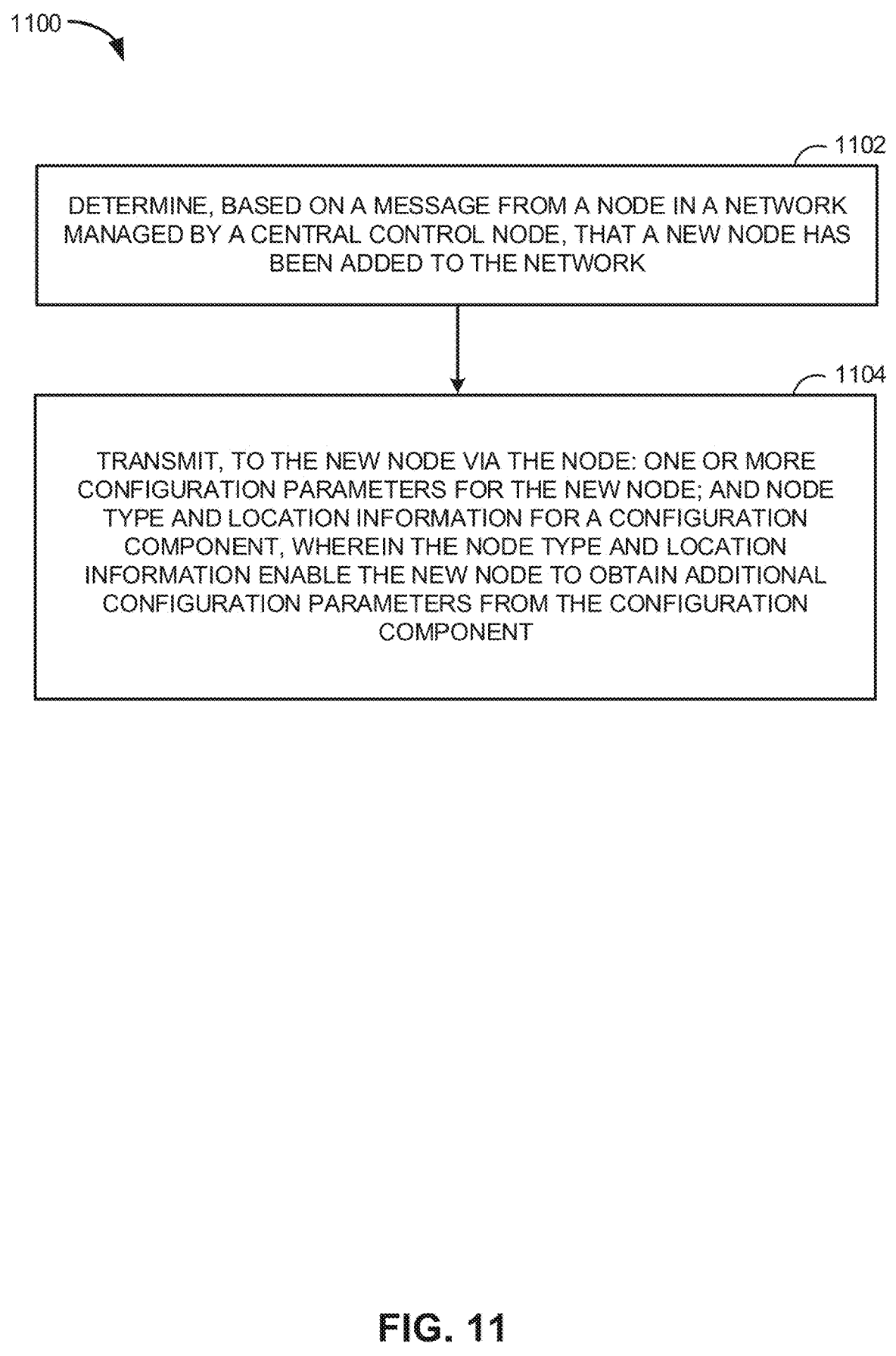

DETERMINE, BASED ON A MESSAGE FROM A NODE IN A NETWORK MANAGED BY A CENTRAL CONTROL NODE, THAT A NEW NODE HAS BEEN ADDED TO THE NETWORK

1104

TRANSMIT, TO THE NEW NODE VIA THE NODE: ONE OR MORE CONFIGURATION PARAMETERS FOR THE NEW NODE; AND NODE TYPE AND LOCATION INFORMATION FOR A CONFIGURATION COMPONENT, WHEREIN THE NODE TYPE AND LOCATION INFORMATION ENABLE THE NEW NODE TO OBTAIN ADDITIONAL CONFIGURATION PARAMETERS FROM THE CONFIGURATION COMPONENT

AUTOMATED NETWORK DISCOVERY, SECURE NETWORK COMMUNICATIONS, AND AUTOMATED NETWORK CONFIGURATION

BACKGROUND

A network may include a variety of network elements, such as switches, gateways, firewalls, load balancers, optical line terminals (OLTs), broadband network gateways (BNGs), routers, and aggregation switches. Such network elements may be monitored, configured, and/or otherwise managed by one or more components such as a central control node within the network. For example, an access gateway serving as a central control node for a network may perform configuration and/or management functionality with respect to network elements in the network.

It can be challenging for a central control node to track and manage all network elements in a network as new network elements join the network. In some cases, such tracking and managing is performed at the layer 3 (L3) level and above, such as in order to utilize secure communication and addressing techniques available at the L3 level. However, network routing issues and/or network segmentation at the L3 level may raise additional challenges associated with such tracking and managing. For example, loss of L3 connectivity may interrupt or otherwise negatively impact such functionality.

BRIEF DESCRIPTION OF THE DRAWINGS

FIG. 6 is a sequence diagram depicting example operations related to secure network communications, according to certain embodiments.

FIG. 9 is a flow chart depicting example operations related to automated network discovery, according to certain embodiments.

FIG. 10 is a flow chart depicting example operations related to secure network communications, according to certain embodiments.

FIG. 11 is a flow chart depicting example operations related to automated network configuration, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
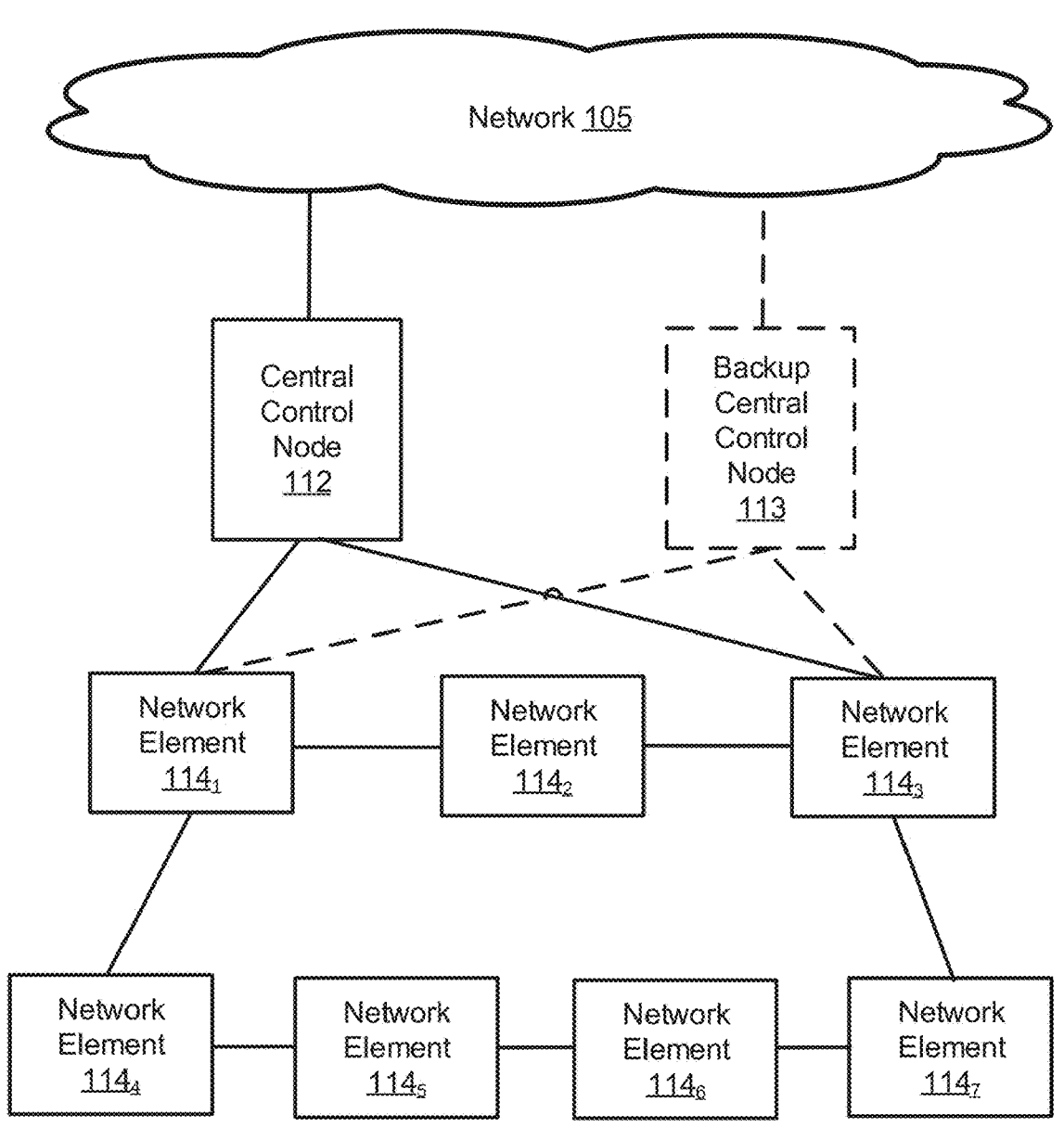
FIG. 1 is an illustration of an example networking environment in which operations related to automated network discovery, secure network communications, and/or automated network configuration may be performed, according to certain embodiments.

The present disclosure relates to automated network discovery, secure network communications, and automated network configuration. An example of a network in which techniques described herein may be performed is described below with respect to FIG. 1.

For example, the present disclosure provides an approach for discovering and generating a record of network topology through propagation of a token throughout the network by a central control node. As described in more detail below with respect to FIGS. 2-4, each node (e.g., network element) in the network may, upon receiving the token and performing a token validation process, transmit the token to other nodes via outgoing interfaces, and may respond to the central control node (e.g., directly or through other intermediate nodes) with neighbor information indicating information of neighboring nodes in the network. Such neighbor information may be received by the central control node and used to generate a topological representation of the network.

Furthermore, the present disclosure provides an approach for enabling secure communications between nodes of a network at the layer 2 (L2) level through certificate-based secure sessions. For example, as described in more detail below with respect to FIGS. 5-7, nodes in the network may store (e.g., pre-install) root certificates of one or more certificate authorities in trust stores, and may use the stored root certificates to verify certificates that are signed by such certificate authorities and exchanged between the nodes. Nodes may be identified in this process based on device identifiers rather than L3 network addresses. A secure communication session may be established between each pair of nodes in the network based on such verified signed certificates, such as involving the generation of ephemeral shared keys. Subsequently, communication among nodes may be sent in an encrypted manner via these secure communication sessions at the L2 level.

Additionally, the present disclosure provides an approach for automated configuration of nodes in a network by dynamically deploying configuration information via a central control node and an automated configuration component as nodes are added to the network. As described in more detail below with respect to FIG. 8, a central control node may, upon receiving a notification of a new node in the network, send the new node (e.g., directly or via one or more intermediate nodes) initial configuration information as well as location information of a configuration component (e.g., a zero touch provisioning sever or another automated configuration component). The new node may configure itself according to the initial configuration, and may request a full configuration from the configuration component based on the location information. The configuration component may transmit a full configuration to the new node, and the new node may configure itself accordingly.

Embodiments of the present disclosure improve upon existing network discovery, secure communication, and automated network configuration techniques in a variety of ways. For example, rather than each node individually contacting the central control node and/or configuration component in order to provide topological information and/or to be configured, which requires each node to be configured in advance with information enabling such contact, techniques described herein allow nodes to be automatically discovered by the central control node through a distributed neighbor-based process and enable each new node to be automatically provided with configuration information. Furthermore, while existing network communication techniques involve secure communication at the L3 level, techniques described herein enable secure communication at the L2 level through a certificate-based technique, thereby enabling secure communication to continue even when connectivity issues at the L3 level occur. By performing automated network discovery, secure communication, and automated network configuration at the L2 level, rather than the L3 level, aspects of the present disclosure allow such functionality to be provided in an efficient and consistent manner despite changes at the L3 level (e.g., including internet protocol routing issues) over time.

Automated discovery, secure communication, and automated configuration techniques described herein significantly reduce manual intervention in network management while enhancing security and flexibility. For example, aspects of the present disclosure enable real-time monitoring and detection of topology changes and operate in a distributed manner, reducing reliance on a single potential point of failure. Techniques described herein further improve node failure handling by automatically detecting node failures and automatically making configuration changes as appropriate, such as to reroute traffic around a failed node. For example, if a node reports to the central control node that a neighboring node has lost connectivity, the central control node and related network element nodes may automatically recalculate an L2 switch table (e.g., L2 switch table 390 of FIG. 12) based on the updated topology and may automatically deploy updated configurations to affected nodes. The secure communication techniques described herein provide a comprehensive approach to network security that operates at a fundamental level (L2), integrates seamlessly with network discovery and auto-configuration processes, and offers dynamic, real-time protection against a wide range of potential threats. Automated configuration techniques described herein may leverage discovered topology for context-aware configuration, and may involve deploying pre-defined configuration templates based on device type and network position as well as assisting nodes with connecting to automated configuration components.

Generally, techniques described herein provide a next-generation solution for network management, addressing key challenges in discovery, security, and configuration. By operating at the L2 level and incorporating advanced cryptographic techniques, aspects of the present disclosure offer unparalleled visibility, security, and control over complex network environments.

FIG. 1 is an illustration 100 of an example networking environment in which operations related to automated network discovery, secure network communication, and automated network configuration may be performed, according to certain embodiments.

In illustration 100, a plurality of nodes are connected via a network 105. Network 105 may, for example, be a private network such as a wireless fidelity (Wi-Fi) network in a residential environment. The nodes in network 105 include a central control node 112, an optional backup central control node 113, and a plurality of network elements 114$_{1-7}$ (which may also be referred to collectively as network elements 114 and individually as network element 114). The nodes in network 105 may be connected to one or more other networks, such as the Internet, such as via an access gateway or other component. In one aspect, central control node 112 (and, in some cases, backup central control node 113) may be an example of an access gateway. For example, the nodes in network 105 may be connected to one another via L2 connectivity and may be connected to one another (and in some embodiments to other endpoints on one or more other networks) via L3 connectivity. The nodes may be addressable on the L3 network by network addresses such as internet protocol (IP) addresses, and may be addressable on the L2 network by other identifiers or addresses (e.g., device identifiers), such as media access control (MAC) addresses.

Central control node 112 and, in some aspects, backup central control node 113, may perform management functionality with respect to the nodes of network 105 such as network elements 114. Management functionality may include, for example, discovering and maintaining a record of the topology of network 105, handling configuration of network elements 114 (e.g., based on the topology and/or otherwise based on device types of network elements 114), providing a comprehensive view of the network for administrators, and/or the like. Backup central control node 113 may be a backup or failover node that is synchronized with central control node 112 (e.g., backup central control node 113 may be redundant of central control node 112), and may take over management functionality from central control node 112 in the event of a failure of central control node 112, such as if central control node 112 loses connectivity or otherwise becomes unavailable to perform management functionality. Other embodiments do not include backup central control node 113.

Each network element 114 may be a component that performs functionality related to network 105, such as a gateway, switch, firewall, security component, load balancer, optical line terminal (OLT), router, broadband network gateway (BNG), aggregation switch, control element (CE), provider element (PE), and/or the like. Network elements 114 may be physical devices and/or virtual devices (e.g., virtual machines, containers, and/or the like) running on one or more physical devices, and/or may represent functionality implemented via software and/or hardware.

Various connections exist among the nodes of network 105. For example, central control node 112 is connected to network elements 114$_1$ and 114$_3$. Backup central control node 113 may also be connected to network elements 114$_1$ and 114$_3$. Network elements 114$_1$ and 114$_3$ are both connected to network element 114$_2$. Network element 114$_1$ is connected to network element 114$_4$ and network element 114$_3$ is connected to network element 114$_7$. Network element 114$_4$ is connected to network element 114$_5$ and network element 114$_7$ is connected to network element 114$_6$. Furthermore, network elements 114$_5$ and 114$_6$ are connected to one another.

In some embodiments, network 105 further comprises one or more certificate authorities and one or more configuration components.

Techniques described herein may be used to automatically discover the topology of network 105, enable secure communications at the L2 level within network 105, and automatically configure the nodes in network 105, as described in more detail below with respect to FIGS. 2-11.

Figure 2:
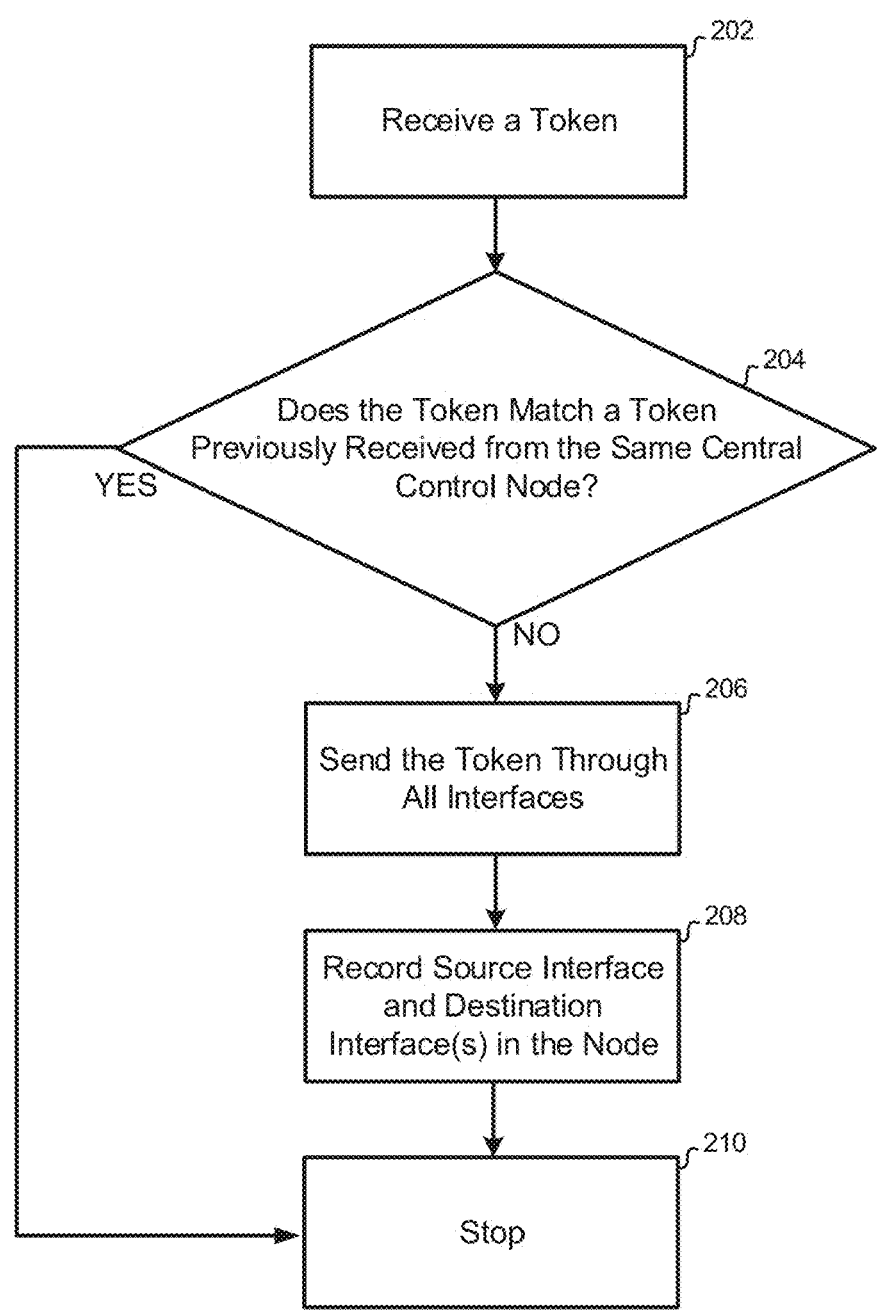
FIG. 2 is a flow chart depicting an example token handling process related to automated network discovery, secure network communications, and/or automated network configuration, according to certain embodiments.

FIG. 2 is a flow chart 200 depicting an example token handling process related to automated network discovery, secure network communications, and/or automated network configuration, according to certain embodiments. Flow chart 200 may be performed by one of the nodes in network 105, such as a network element 114, of FIG. 1.

In one example, central control node 112 of FIG. 1 generates a token and propagates the token throughout network 105 of FIG. 1 in order to discover the topology of the network. For example, central control node 112 of FIG. 1 may send the token to network elements 114₁ and 114₃ of FIG. 1, which may in turn forward the token to other network elements as appropriate. Each network element, upon receiving the token, may perform functionality as described with respect to flow chart 200. The token may include, for example, the identity of central control node 112 of FIG. 1 (e.g., an L2 identifier such as a MAC address or other device identifier), a certificate of central control node 112 of FIG. 1, a digital signature of central control node 112 of FIG. 1, a cryptographic mechanism, a list of traversed nodes (e.g., which may be iteratively updated as the token traverses nodes), a sequence number, and/or the like.

At block 202, a token is received (e.g., by a network element 114 of FIG. 1).

At decision 204, a determination is made of whether the token (e.g., received at block 202) matches a token previously received from the same central control node. For example, the token may be compared to one or more previously-received tokens. If the token matches a previously-received token, then an identifier of the central control node that sent the token may be retrieved from the token and compared to an identifier from the previously-received token to determine if the same central control node sent the previously-received token.

If a determination is made at decision 204 that the token matches a token previously received from the same central control node, then operations proceed to block 210, where no further action is taken with respect to the token (e.g., the token is not forwarded to any other nodes and, in some embodiments, may be deleted). In some embodiments, if the token matches a token previously received from the same central control node, a determination may be made of whether all interfaces acknowledged receipt of the previous token within a timeout period and, if any interface(s) did not acknowledge receipt of the previous token within the timeout period, then the token may be sent again on those interface(s). If all interfaces acknowledged receipt of the previous token within the timeout period then the token may not be forwarded on any interfaces.

If a determination is made at decision 204 that the token does not match a token previously received from the same central control node, then operations proceed to block 206, where the token is sent through all interfaces. For example, the network element may forward the token through all outgoing interfaces (e.g., interfaces by which the network element communicates with downstream network elements). For example, each node may have multiple interfaces for connections to other nodes, and block 206 may involve sending the token through all interfaces except the interface on which the token was received.

After block 206, operations may proceed to block 208, where the source interface and the destination interface(s) are recorded in the node (e.g., in the network element). For example, the network element may store a record of the interface on which the token was received and the one or more interfaces on which the token was sent, and this record may be used in a reply process by which the network element reports topological information back to the central control node based on the token. In some aspects, the node's identifier (e.g., L2 identifier) may be appended to the token's list of traversed nodes and the list may be sent with the token on all interfaces. The record of receiving interface and destination interface(s) may also be appended to the token's list of traversed nodes and forwarded with the token on all interfaces.

After block 208, operations may proceed to block 210, where the token handling process is complete, at least until the reply process.

In some embodiments, the node also verifies authenticity of the token based on a certificate and/or digital signature included with the token. For example, after block 202, the node may compare the digital signature and/or certificate included with the token to a stored certificate in a trust store associated with the node. If the node verifies the signature and/or certificate, then the node may continue with the token handling process described herein (e.g., sending the token through all interfaces if the token does not match a previously-received token from the same central control node). Otherwise, if the node is unable to verify the signature and/or certificate, then the node may proceed to block 210 and halt the process (e.g., determining not to forward the token and, in some embodiments, deleting the token).

In some embodiments, a timeout mechanism is utilized to prevent infinite loops and ensure complete network coverage. For example, if a node does not receive a response to a token message from one or more recipients within a threshold amount of time, then the node may re-send the token message to the one or more recipients. Sequence numbers included in tokens, as well as checks to determine whether a received token matches a token previously received from the same central control node, may prevent duplicate processing of tokens.

Figure 3:
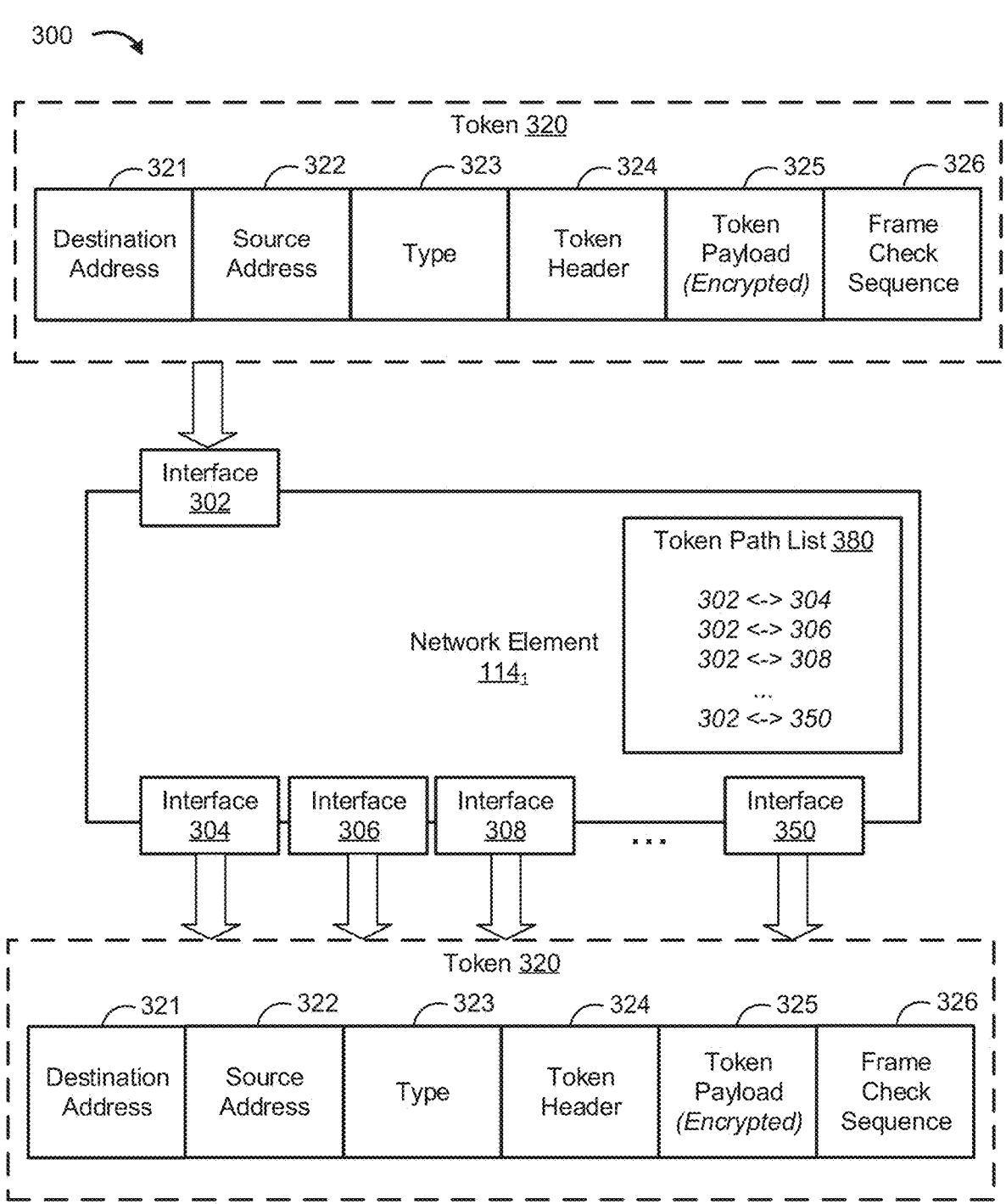
FIG. 3 is an illustration of an example of token handling related to automated network discovery, secure network communications, and/or automated network configuration, according to certain embodiments.

FIG. 3 is an illustration 300 of an example of token handling related to automated network discovery, secure network communications, and/or automated network configuration, according to certain embodiments. Illustration 300 includes network element 114₁ of FIG. 1 and may correspond to functionality described above with respect to flow chart 200 of FIG. 2.

A token 320 is received at an interface 302 of network element 114₁, such as from central control node 112 of FIG. 1. Token 320 includes a destination address 321, which may comprise an identifier (e.g., L2 identifier such as a MAC address or other device identifier) of the device(s), endpoint(s), or group(s) to which token 320 is sent (e.g., network element 114₁). In one example, destination address 321 includes a fixed multicast MAC address. Token 320 further comprises a source address 322, which may comprise an identifier (e.g., L2 identifier such as a MAC address or other device identifier) of the device or interface from which the token 320 was sent (e.g., central control node 112 of FIG. 1). Token 320 further comprises a type 323, which may indicate a type of token 320. Token 320 further comprises a token header 324, which generally includes data about token 320 such as a version (e.g., identifying the token data format version for compatibility checks), a source identifier (e.g., a unique identifier such as a MAC address or other L2 identifier of the device that originated the token, such as central control node 112 of FIG. 1), a sequence number (e.g., unique identifier for the specific token message to prevent duplication and ensure message order), a message type (e.g., indicating a type of the token message, such as discovery request, discovery node reply, authentication initiation, authentication acknowledgment, authentication rejection, or configuration), security options (e.g., am encryption algorithm and/or other security parameters used for secure communication), and/or the like.

Token 320 further comprises a token payload 325, which may be encrypted, and which may include contents that vary based on the token message type. If the token message is of a discovery type, then token payload 325 may include identity information, such as for reporting newly discovered nodes' identity information (e.g., device MAC address, type, mode, healthy status, certificate, digital signature, and/or the like).

If the token message is of a node reply type, such as a token message included by each node when reporting to the source of the token, token payload 325 may include a node identifier (e.g., MAC address or other device identifier) of the node sending the reply, neighbor information (e.g., a list of information about one or more neighbors of the node that is sending the reply, such as a neighbor device identifier, a local interface by which the node that is sending the reply connects to the neighbor, and/or the like), device information of the node that is sending the reply (a device type such as a hardware type used to describe the node's network role such as OLT, router, CE, PE, or the like), traffic status or network status of the node that is sending the reply (e.g., a network bandwidth utilization rate, a network clock used to maintain network time synchronization, provide accurate time and date information, and/or the like, a network packet loss rate for use in identifying bottlenecks), and/or the like. As used herein, network status information may refer to information related to network connectivity and/or performance of a node, such as a network bandwidth utilization rate, a network clock used to maintain network time synchronization, provide accurate time and date information, and/or the like, a network packet loss rate for use in identifying bottlenecks, whether a node is in a healthy state, whether a node is experiencing a network connectivity issue, and/or the like.

If the token message is of an authentication initiation type, such as a token message sent by one node attempting to establish a secure communication session with another node, token payload 325 may include a certificate chain (e.g., a signed certificate along with one or more intermediate certificates as appropriate), one or more supported encryption algorithms (e.g., a list of encryption algorithms supported by the node), one or more ephemeral shared key generation parameters, an ephemeral shared key generation public key, a signature (e.g., a signed hash digest of the entire payload to prove the owner of the certificate and to attest to the integrity of the data), and/or the like. It is noted that an ephemeral shared key generation public key may also be referred to as an ephemeral shared keys generation public key, as such a key may be used to generate one or more ephemeral shared keys.

If the token message is of an authentication acknowledgment type, such as a token message sent by a node in response to another node that requested to establish a secure communication session with the node, token payload 325 may include a certificate chain (e.g., a signed certificate along with one or more intermediate certificates as appropriate, such as including a device certificate that includes a public key), a selected encryption algorithm (e.g., selected from a list of supported encryption algorithms included in an authentication initiation message), an ephemeral shared key generation public key, a signature (e.g., a signed hash digest of the entire payload to prove the owner of the certificate and to attest to the integrity of the data), and/or the like.

If the token message is of an authentication rejection type, such as a token message sent by a node in response to another node that requested to establish a secure communication session with the node if the node is rejecting the request, token payload 325 may include a reason why the node is rejecting the connection establishment.

If the token message is of a configuration type (e.g., configuration request or configuration status), such as a token message sent by a central control node or a configuration component to a node that is being configured, token payload 325 may include a target node identifier (e.g., a device identifier of the node receiving the configuration), a configuration template identifier (e.g., a reference to a specific pre-defined configuration template stored at the central control node or the configuration component), configuration data (e.g., values for parameters to be configured), a configuration status (e.g., reporting configuration status for an automatic configuration process), and/or the like.

Token 320 further comprises a frame check sequence 326, which generally represents an error-detecting code added to a frame in a communication protocol.

Network element 114$_1$ receives token 320 via interface 302, and may verify the authenticity of token 320 (e.g., based on a certificate and/or signature included in token 320) and/or may determine whether token 320 matches any tokens that network element 114$_1$ previously received from the same central control node. If network element 114$_1$ determines that token 320 should be forwarded on all interfaces, such as if token 320 is authenticated and does not match any tokens previously received from the same central control node, then network element 114$_1$ may transmit token 320 on interfaces 304, 306, 308, 350, and all other interfaces other than interface 302. Network element 114$_1$ may store a token path list 380 that includes the interface on which token 320 was received and each interface on which token 320 was transmitted. For example, because token 320 was received on interface 302 and transmitted on interfaces 304, 306, 308, 350, and one or more additional interfaces (not shown), token path list 380 includes the list (302<->304, 302<->306, 302<->308, ... 302<->350). In some embodiments, network element 114$_1$ updates token 320 based on token path list 380 and/or to include an identifier of network element 114$_1$ in the token's node traversal list prior to transmitting token 320. Network element 114$_1$ may also include a device identifier, certificate, and/or signature of network element 114$_1$ in the token that it transmits to other nodes. Token path list 380 and neighbor information may be used to determine the network topology, while L2 switch table 390 of FIG. 12 (described below) may be used to select an output interface on which to send a token.

Figure 4:
FIG. 4 is a sequence diagram depicting example operations related to automated network discovery, according to certain embodiments.

FIG. 4 is a sequence diagram 400 depicting example operations related to automated network discovery, according to certain embodiments. Sequence diagram 400 includes central control node 112, network element 114$_1$, and network element 114$_2$ of FIG. 1.

At block 402, central control node 112 sends a token with a topology discovery request (e.g., a token message of discovery request type) to network element 114$_1$. At block 404, network element 114$_1$ validates the signature in the token (e.g., by verifying the signature via the device certificate and root certificate stored in trust store associated with network element 114$_1$). If the signature is not determined to be valid, then network element 114$_1$ may drop the token and perform no further token processing. If the signature is determined to be valid, then network element 114$_1$ may proceed with processing of the token (e.g., with block 406 and so on).

At block 406, network element 114₁ reports its neighbor information to central control node 112. For example, network element 114₁ may send a node reply type token message to central control node 112 that includes a device identifier of network element 114₁, and information of one or more neighbors of network element 114₁, such as network element 114₂, such as including the interface(s) by which network element 114₁ connects to such neighbor(s). A node may be considered a neighbor of another node if the node and the other node are directly connected to one another.

At block 408, network element 114₁ forwards the token with the topology discovery request to network element 114₂. While not shown, the token may be forwarded to one or more additional nodes as well, such as via all interfaces of network element 114₁ except the interface on which network element 114₁ received the token.

At block 410, network element 114₂ validates the signature in the token. For example, the token forwarded at block 408 may include the signature of central control node 112 and/or the signature of network element 114₁, and network element 114₂ may validate one or more such signatures, such as based on device certificate of network element 114₁ and root certificates in a trust store associated with network element 114₂. If a signature is not determined to be valid, then network element 114₂ may drop the token and perform no further token processing. If the signature(s) is/are determined to be valid, then network element 114₂ may proceed with processing of the token (e.g., with block 412 and so on).

At block 412, network element 114₂ reports its neighbor information to network element 114₁. For example, network element 114₂ may send a node reply type token message to network element 114₁ that includes a device identifier of network element 114₂, and information of one or more neighbors of network element 114₂, such as network element 114₃ of FIG. 1, such as including the interface(s) by which network element 114₂ connects to such neighbor(s). At block 414, network element 114₁ forwards the neighbor information received from network element 114₂ to central control node 112.

At block 416, central control node 112 generates or updates a topology record/map based on the neighbor information received at block 406 and/or block 414. For example, central control node 112 may maintain a record (or map) of the topology of the network, and may keep the record up to date as topological information (e.g., neighbor information) is received from nodes of the network over time. Central control node 112 may use such information to assist with configuration of nodes in the network, to provide an administrator with a comprehensive view of the network, and/or the like. In some cases, central control node 112 uses the topology record for load balancing, root cause analysis for performance issues and other issues, routing, and/or the like. The topology record provides detailed, real-time topology information for efficient problem diagnosis, and supports rapid isolation of network issues through comprehensive visibility.

Figure 12:
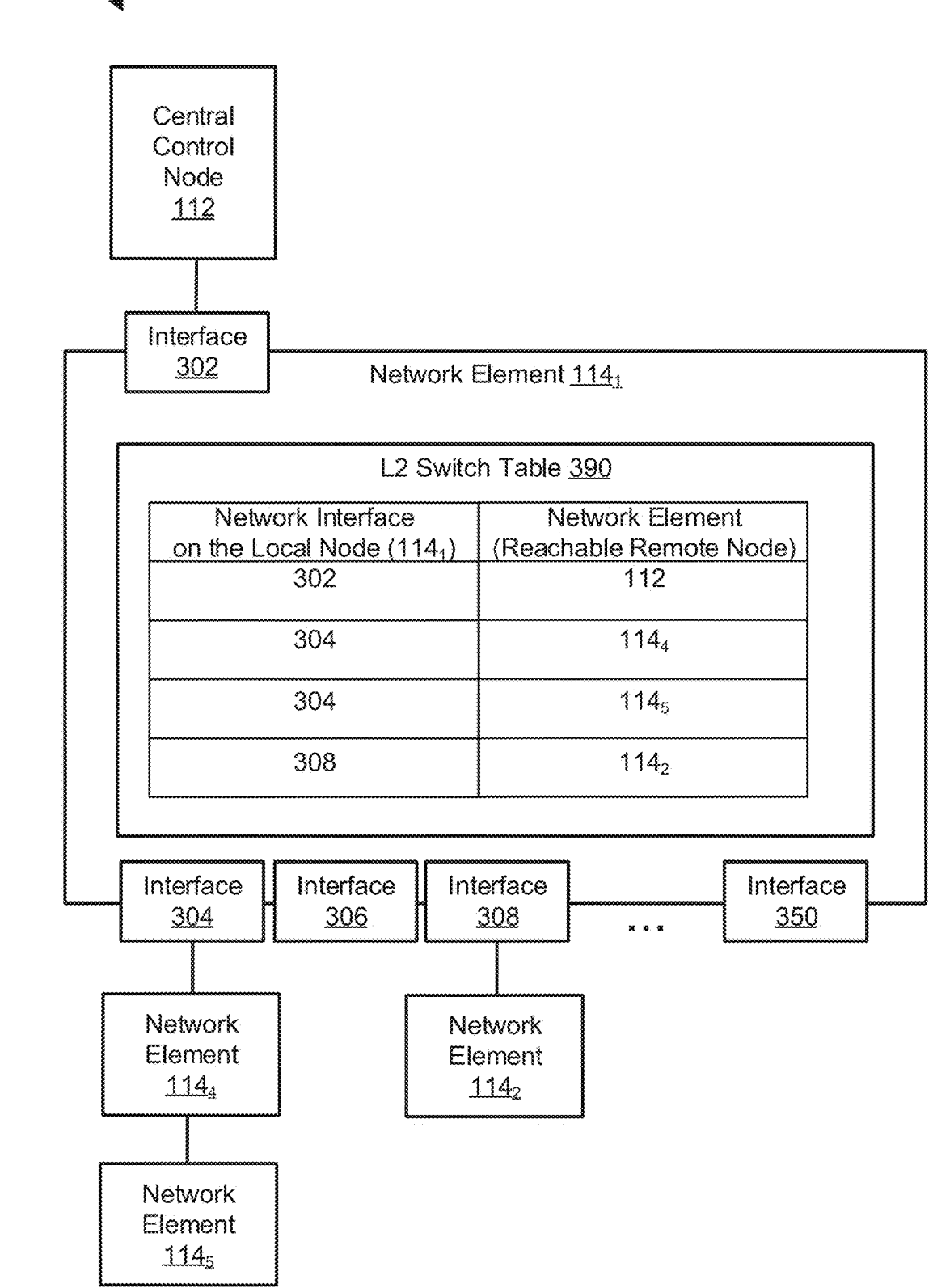
FIG. 12 is a diagram depicting an example switch table, according to certain embodiments.

In some cases, central control node 112 and network elements will automatically setup an L2 switch table, such as L2 switch table 390 of FIG. 12 through the token passing technique. In such a case, if a primary path fails, an alternative L2 switch sable 390 may be automatically created by token propagation and used to automatically reconfigure one or more network elements (e.g., central control node 112 may automatically generate and propagate configuration changes to one or more nodes in order to cause utilization of such alternate routes).

In some aspects, central control node 112 periodically (e.g., at regular intervals or when certain conditions occur) broadcasts a token to collect updated topological information in a similar manner, and updates the topology record accordingly, such as making determinations related to network management based on such updated topology information.

In some aspects, nodes are configured to initiate a registration process with the central control node upon booting up, such as reporting their own identity and neighbor node information to the central control node, either directly or via one or more intermediate nodes. Nodes may also be configured to send departure signaling to the central control node (either directly or via one or more intermediate nodes) and/or to neighbor nodes before disconnecting, such as allowing the central control node and/or the neighbor nodes to update the network topology accordingly. In some cases, if a node fails to respond, one or more neighboring nodes may detect the failure and report it to the central control node. In such a case, the central control node may initiate a localized re-discovery process (e.g., localized to the area of the failed node, such as to nodes that are neighbors of the failed node or within a certain number of hops of the failed node) to update the topology. The central control node may then automatically generate and propagate configuration changes (e.g., to one or more nodes) to reroute traffic around the failed node based on the updated topology.

In some cases, nodes may be configured to periodically (e.g., at regular intervals and/or when some condition occurs, such as a significant change in status) report their status and neighbor information to the central control node, either directly or via one or more intermediate nodes. The central control node may be configured to identify and report topology changes detected through periodic token broadcasting, including potential reasons for the changes. In some aspects, other nodes may be notified (e.g., by central control node 112) when a new node is added to the network topology, such as for optimizing of routing and/or load balancing.

Some aspects may involve dynamically adjusting the frequency of topology updates, such as based on network stability and/or resource availability. Some implementations may involve event-driven reporting (e.g., from network elements to the central control node) for immediate notification of critical changes. These comprehensive fault tolerance and robustness features ensure that the network discovery and management system can maintain operational integrity and accuracy even in challenging conditions. By addressing various failure scenarios and incorporating multiple layers of resilience, techniques described herein provide a highly reliable foundation for modern network infrastructures.

Tokens sent for topology discovery as described herein may traverse the entire network, resulting in a complete picture of the network's topology being generated and maintained in an up-to-date manner at the central control node. Topologies discovered using techniques described herein may include, for example, ring/sub-ring topologies, trees/multi-layer topologies, mesh topologies, and/or the like. Furthermore, techniques described herein enable automated discovery and maintaining of topologies that include multi-interface nodes, such as including interface information in the stored topology record/map at the central control node.

In some aspects, the central control node collects all nodes' reply-frames (node reply type token messages) within a defined timeout period and uses the collected data to build a comprehensive network topology map. The central control node may compare the current topology with a snapshot of the previous topology (e.g., before the most recent update) to identify newly added network nodes, disconnected links or removed network nodes, changes in network links or node relationships, and/or the like. The topology may be continuously updated based on periodic reports and detected changes. The central control node may analyze the topology for potential issues such as loops, isolated nodes, or suboptimal paths, and may make configuration changes as appropriate (e.g., automatically generating and transmitting configuration changes to nodes as appropriate to make such changes).

Figure 5:
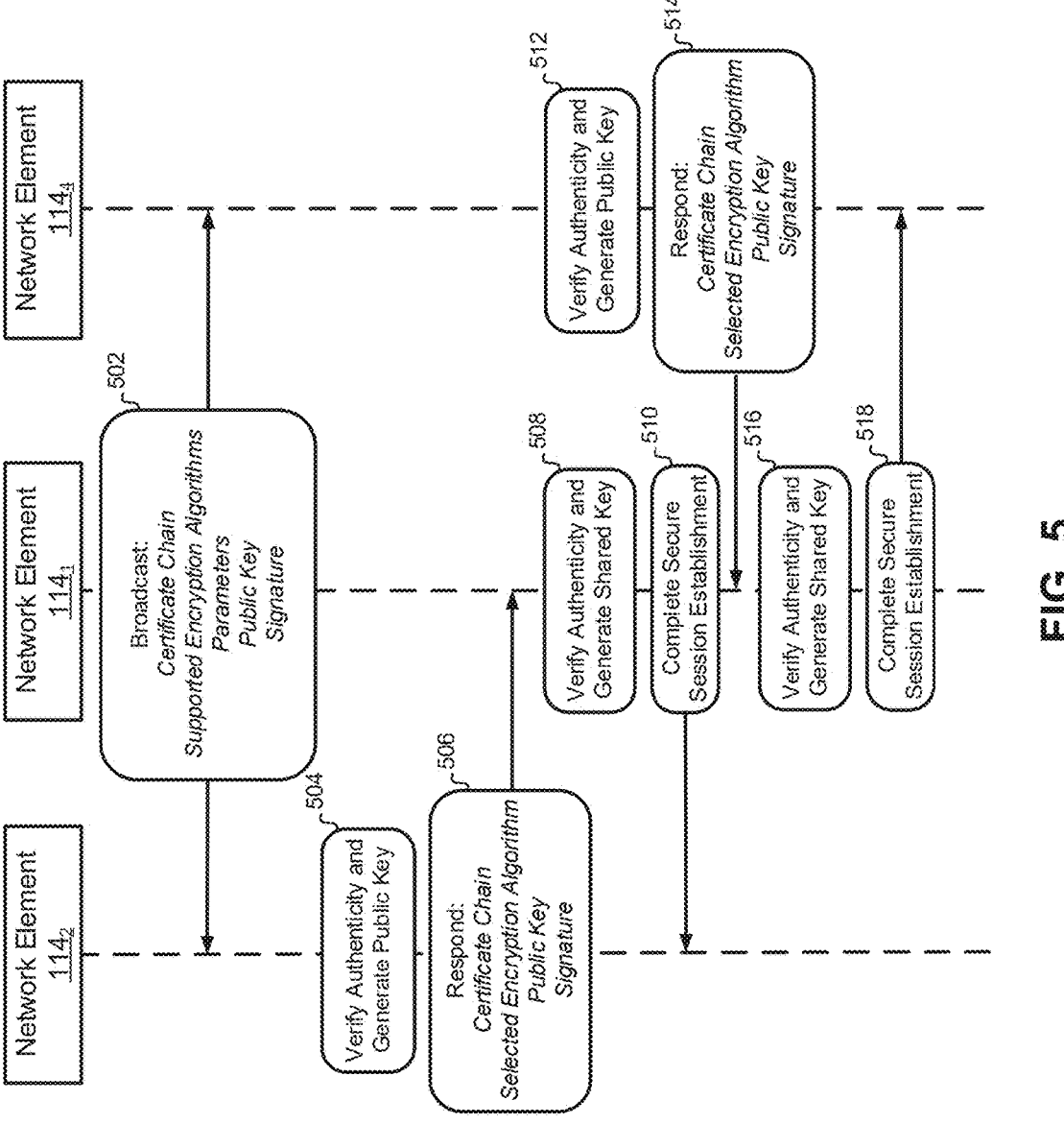
FIG. 5 is a sequence diagram depicting example operations related to secure network communications, according to certain embodiments.

FIG. 5 is a sequence diagram 500 depicting example operations related to secure network communications, according to certain embodiments. Sequence diagram 500 includes network elements $114_1$, $114_2$, and $114_4$ of FIG. 1. In particular, sequence diagram 500 represents functionality related to establishment of secure communication channels between nodes of a network at the L2 level as described herein. In some cases, a process similar to that described with respect to FIG. 5 is performed in order to establish a secure channel between every pair of nodes connected to one another in the network (e.g., including between the central control node and the network element(s) connected to the central control node).

At block 502, network element $114_1$ sends a broadcast message to one or more neighboring nodes, including network element $114_2$ and network element $114_4$. For example, network elements $114_2$ and $114_4$ may be new nodes in the network. The broadcast message (e.g., an authentication initiation type token message) includes a certificate chain (e.g., including a device certificate that includes a public key), one or more supported encryption algorithms, one or more ephemeral shared key generation parameters, an ephemeral shared key generation public key, and a signature. As described in more detail below with respect to FIG. 6, the certificate(s) in the certificate chain may have been generated with the involvement of a certificate authority. In one example, the supported encryption algorithms include one or more symmetric encryption algorithms such as AES-128-CCM and AES-256-GCM, the parameters include DH parameters, and the public key is a DH public key. The signature may be a signature for the entire package, such as generated by the private key corresponding to the public key inside the device certificate signed by the assistance of a certificate authority.

At block 504, network element $114_2$ verifies authenticity of the broadcast message and generates a public key. For example, network element $114_2$ may verify the certificate(s) and/or signature(s) in the broadcast message to stored certificate(s) in a trust store associated with the network element $114_2$. If network element $114_2$ is unable to verify the message, then it may discard the message without further processing. If network element $114_2$ verifies the message, then it may proceed with processing the message (e.g., generating a public key, block 506, and so on). Generating a public key may be part of a shared key generation process in which network element $114_2$ generates a public key and a private key (e.g., which may be DH key pairs). Network element $114_2$ may also select an encryption algorithm from the supported encryption algorithms listed in the broadcast message.

At block 506, network element $114_2$ sends a response to network element $114_1$ (e.g., a response to the broadcast message), which may be in the form of an authentication acknowledgment type token message. The response may include a certificate chain, a selected encryption algorithm (e.g., selected from the supported encryption algorithms listed in the broadcast message), a public key (e.g., which may be a DH public key generated by network element $114_2$), and a signature (e.g., of network element $114_2$).

At block 508, network element $114_1$ may verify authenticity of the response message sent at block 506 (e.g., based on one or more stored certificates in a trust store associated with network element $114_1$), and may generate a shared key (e.g., a shared symmetric encryption key) to be shared between network element $114_1$ and network element $114_2$ for secure communication. For example, the shared key may be generated based on the public key of network element $114_2$ and/or other information that was included in the response message.

At block 510, network element $114_1$ completes the establishment of a secure session with network element $114_2$, such as by sending an authentication acknowledgment type token message. Subsequently, communications between network elements $114_1$ and $114_2$ (e.g., including communications related to topology discovery and/or configuration of nodes) may be sent via the secure session, such as using the encryption algorithm that was selected, and such communications may be encrypted and decrypted using the shared key between these nodes.

Similarly, at block 512, network element $114_4$ verifies authenticity of the broadcast message and generates a public key. For example, network element $114_4$ may verify the certificate(s) and/or signature(s) in the broadcast message to stored certificate(s) in a trust store associated with the network element $114_4$. If network element $114_4$ is unable to verify the message, then it may discard the message without further processing. If network element $114_4$ verifies the message, then it may proceed with processing the message (e.g., generating a public key, block 514, and so on). Generating a public key may be part of a key generation process in which network element $114_4$ generates a public key and a private key (e.g., which may be DH key pairs). Network element $114_4$ may also select an encryption algorithm from the supported encryption algorithms listed in the broadcast message.

At block 514, network element $114_4$ sends a response to network element $114_1$ (e.g., a response to the broadcast message), which may be in the form of an authentication acknowledgment type token message. The response may include a certificate chain, a selected encryption algorithm (e.g., selected from the supported encryption algorithms listed in the broadcast message), a public key (e.g., which may be a DH public key generated by network element $114_4$), and a signature (e.g., of network element $114_4$).

At block 516, network element $114_1$ may verify authenticity of the response message sent at block 514 (e.g., based on one or more stored certificates in a trust store associated with network element $114_1$), and may generate a shared key (e.g., a shared symmetric encryption key) to be shared between network element $114_1$ and network element $114_4$ for secure communication. For example, the shared key may be generated based on the public key of network element $114_4$ and/or other information that was included in the response message.

At block 518, network element $114_1$ completes the establishment of a secure session with network element $114_4$, such as by sending an authentication acknowledgment type token message. Subsequently, communications between network elements $114_1$ and $114_4$ (e.g., including communications related to topology discovery and/or configuration of nodes) may be sent via the secure session, such as using the encryption algorithm that was selected, and such communications may be encrypted and decrypted using the shared key between these nodes.

FIG. 6 is a sequence diagram 600 depicting example operations related to secure network communications, according to certain embodiments. Sequence diagram 600 includes network elements 114₁ and 114₂ of FIG. 1. Sequence diagram 600 further includes a certificate authority, which may be a component (e.g., running on a physical or virtual computing device) in network 105 of FIG. 1 that stores, signs, and issues digital certificates. While a single certificate authority is depicted in sequence diagram 600, other implementations may involve multiple certificate authorities. For example all nodes may obtain and store certificates from multiple certificate authorities in corresponding trust stores, and different nodes may request signed certificates from different certificate authorities.

At block 602, network element 114₁ obtains a root certificate from certificate authority 650. The root certificate may be a digital certificate of certificate authority 650 that is used to certify operations performed by and/or message sent by certificate authority 650 (e.g., signing the certificate of another node). At block 604, network element 114₁ stores (e.g., installs) the root certificate of certificate authority 650 in a trust store associated with network element 114₁. The trust store may be a database or other data storage entity in which certificates are stored for use in verifying communications that are received. The trust store may be part of network element 114₁ or may otherwise be connected to network element 114₁.

At block 606, network element 114₂ obtains the root certificate from certificate authority 650. At block 608, network element 114₂ stores the root certificate of certificate authority 650 in a trust store associated with network element 114₂. The trust store may be a database or other data storage entity in which certificates are stored for use in verifying communications that are received. The trust store may be part of network element 114₂ or may otherwise be connected to network element 114₂.

While not depicted, network element 114₁ and network element 114₂ may also obtain and store root certificates from one or more other certificate authorities.

At block 610, network element 114₁ generates a key pair (e.g., a Rivest-Shamir-Adleman (RSA) private key and public key) and at block 612, network element 114₂ generates a key pair (e.g., a RSA private key and public key). The key pairs may be used for signature generation and verification in association with establishing a secure channel between network element 114₁ and network element 114₂, such as via a process described above with respect to FIG. 5.

At block 614, network element 114₁ sends a certificate signing request to certificate authority 650 (e.g., a request to sign a digital certificate of network element 114₁) and at block 616, certificate authority 650 sends a signed certificate (e.g., certificate authority 650 may sign the certificate and return the signed certificate per the request) to network element 114₁. At block 618, network element 114₂ sends a certificate signing request (e.g., a request to sign a digital certificate of network element 114₂) to certificate authority 650 and at block 620, certificate authority 650 sends a signed certificate (e.g., certificate authority 650 may sign the certificate and return the signed certificate per the request) to network element 114₂.

At 622, a secure channel is established between network element 114₁ and network element 114₂ based on the signed certificates (e.g., sent at blocks 616 and 620) and the key pairs (e.g., generated during the ephemeral shared key generation process). For example, network element 114₁ and network element 114₂ may authenticate one another based on each other's signed certificates (e.g., based on the root certificate of certificate authority 650 that each stores in its trust store) and may negotiate a shared key based on the key pairs. Subsequently, communications between network element 114₁ and network element 114₂ may be sent securely via the secure channel, such as being encrypted and decrypted using the shared key and with an encryption technique negotiated by network element 114₁ and network element 114₂.

Figure 7:
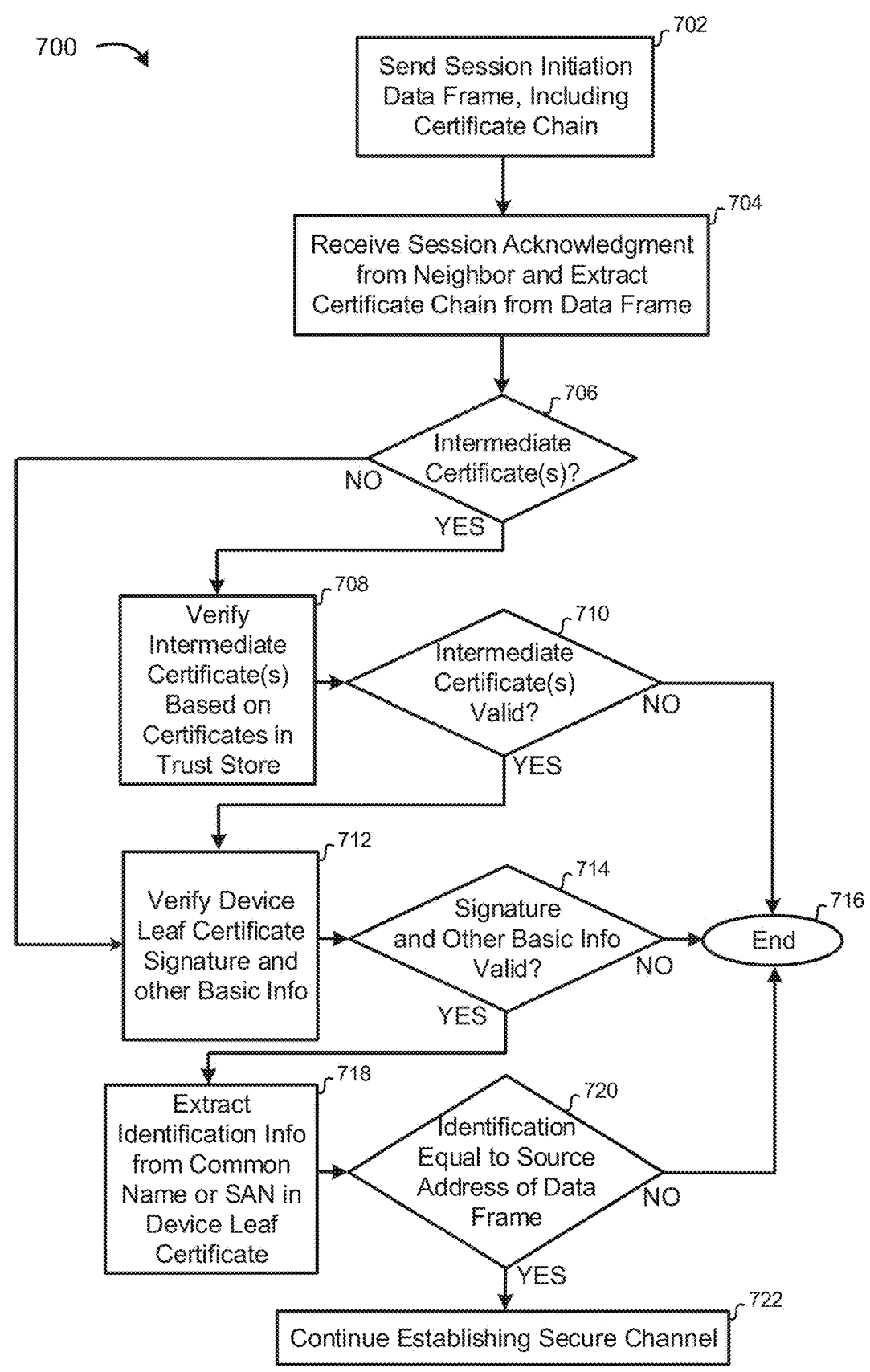
FIG. 7 is a flow chart depicting an example token handling process related to secure network communications, according to certain embodiments.

FIG. 7 is a flow chart 700 depicting an example token handling process related to secure network communications, according to certain embodiments. For example, flow chart 700 may depict functionality performed by a node that is initiating a secure session/channel with another node. For instance, flow chart 700 may depict functionality performed by network element 114₁ of FIG. 1 in connection with sending the broadcast message at block 502 of FIG. 5.

At block 702, a session initiation data frame (e.g., an authentication initiation type token message), including a certificate chain, is sent (e.g., to a neighboring node), At block 704, a session acknowledgment (e.g., an authentication acknowledgment type token message) is received from a neighboring node, and a certificate chain is extracted from the data frame (e.g., the authentication acknowledgment type token message).

At decision 706, a determination is made of whether there are any intermediate certificates in the certificate chain extracted at block 704. For example, a certificate chain may include the certificate of the neighboring node, one or more intermediate certificates, and/or the certificate of a certificate authority that signed the certificate of the neighboring node. If a determination is made at decision 710 that there are no intermediate certificates, then operations may proceed to block 712 (discussed below). If a determination is made at decision 710 that there are one or more intermediate certificates, then operations may proceed to block 708, where the one or more intermediate certificates are verified based on one or more certificates in a trust store. At decision 710, a determination is made of whether the one or more intermediate certificates are valid (e.g., based on the trust store). If the one or more intermediate certificates are not valid, then operations may proceed to block 716, where operations related to establishing the secure channel are ended (e.g., and no secure channel is established). If the one or more intermediate certificates are valid (e.g., matching one or more stored certificates in the trust store), then operations may proceed to block 712.

At block 712, the device leaf certificate signature and other basic information is verified (e.g., based on the trust store and/or based on other logic). At decision 714, a determination is made of whether the device leaf certificate signature and other basic information is valid. If the device leaf certificate signature and other basic information is not valid, then operations may proceed to block 716, where operations related to establishing the secure channel are ended (e.g., and no secure channel is established). If the device leaf certificate signature and other basic information is valid, then operations may proceed to block 718, where identification information is extracted from the common name or subject alternative name (SAN) in the device leaf certificate.

At decision 720, a determination is made of whether the identification information extracted at block 718 is equal to the source address of the data frame. If the identification information is not equal to the source address of the data frame, then operations may proceed to block 716, where operations related to establishing the secure channel are ended (e.g., and no secure channel is established). If the identification information is equal to the source address of the data frame, then operations may proceed to block 722, where establishment of the secure channel continues.

For example, each node may include its identifier (e.g., L2 identifier such as MAC address or other device identifier) in the common name or SAN data field of its certificate. Thus, to verify that a node sending a data frame is in fact the node that generated the signature associated with the data frame, then the source address of the data frame (e.g., the L2 identifier of the device from which the data frame was sent) can be compared to the identifier that is included in the certificate of the device leaf (e.g., the certificate at the end of the certificate chain, or the "leaf" of the certificate chain) to ensure that they match.

Accordingly, techniques described herein provide a novel L2 ephemeral shared key generation algorithm, which may be designed for a 1: N network model, differing from traditional point-to-point models. Aspects of the present disclosure involve establishing individual secure channels between directly connected nodes, creating a network of trusted links rather than relying solely on end-to-end security. For example, techniques described herein involve device authentication and secure communication at the link layer (L2) using certificates (e.g., X.509 certificates), such as incorporating device MAC addresses into such certificates, creating a strong binding between a device's L2 identity and its cryptographic credentials. Aspects of the present disclosure introduce a new certificate verification algorithm based on L2 identification, enhancing the security and authenticity of device recognition.

Some embodiments of the present disclosure utilize key generation algorithms such as Diffie-Hellman Ephemeral (DHE) for strong forward secrecy and involve generating an ephemeral shared secret between nodes. The initiator can negotiate with multiple nodes at the same time for generating shared symmetric encryption key. Every two nodes may independently generate a shared secret using their DHE key pairs and the peer's DHE public key (e.g., the shared secret may be generated by one of the nodes based on its key pairs and the peer's public key), and the shared secret may be used to derive symmetric encryption keys.

Certificate based authentication techniques described herein make use of pre-installed certificates (e.g., in a trust store) for secure communication. For example, each node (e.g., including the central control node) may be equipped with pre-installed certificates (e.g., X.509 certificates). Certificates may be issued by one or more trusted certificate authorities (CAs). A certificate of a device may bind the device's L2 identity to its cryptographic credentials. For example, device-specific information such as a MAC address of a node may be included in the common name (CN) or the subject alternative name (SAN) field of the node's certificate. Thus, comparing the device identifier from a node's certificate to the source address (SA) from a communication may enable confirming authenticity of a source of the communication in a reliable manner.

Secure communication techniques described herein may be used for communications related to automated network discovery and/or automated network configuration as described herein, as well as for other communications at the L2 level between nodes.

Figure 8:
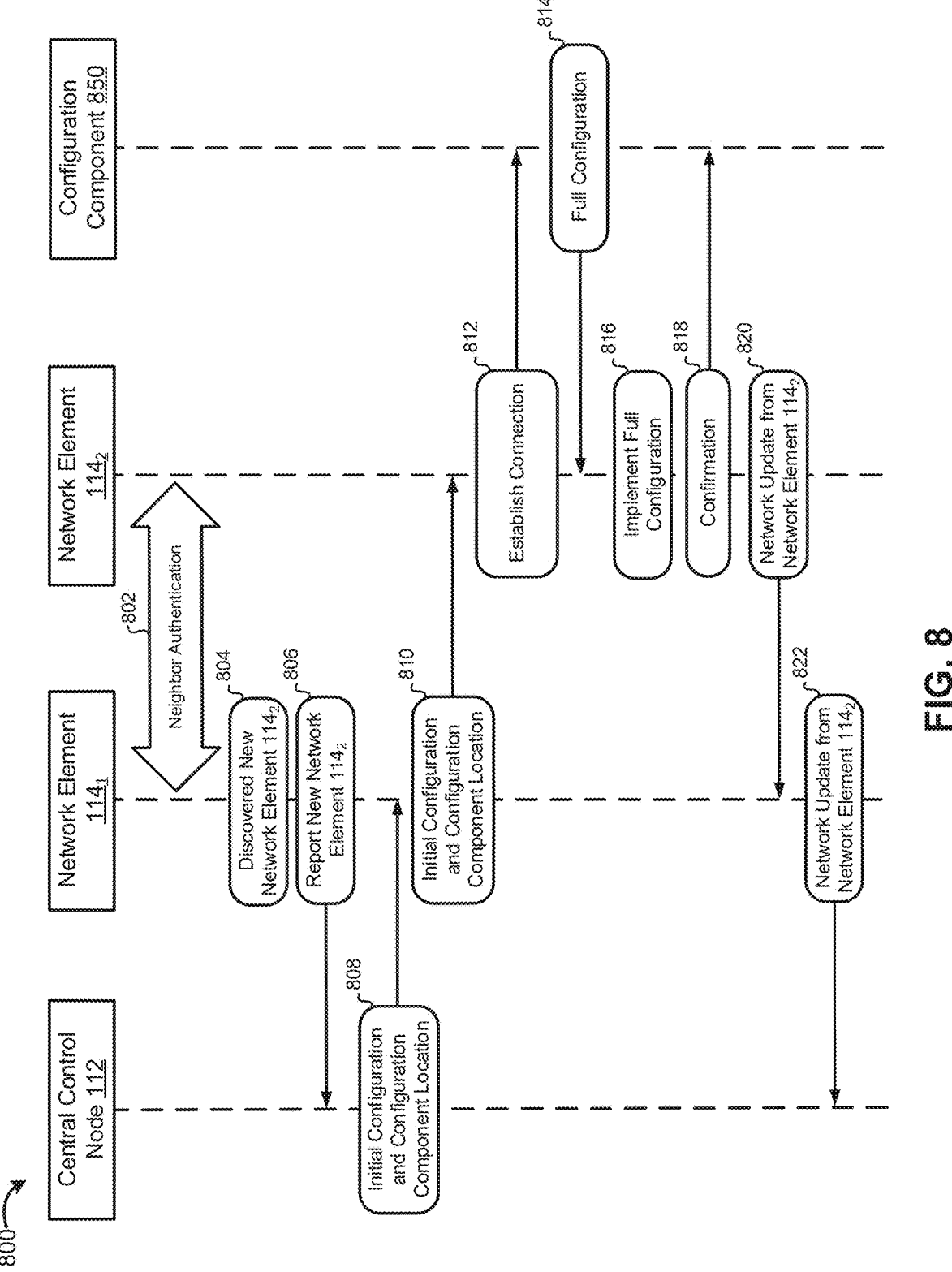
FIG. 8 is a sequence diagram depicting example operations related to automated network configuration, according to certain embodiments.

FIG. 8 is a sequence diagram 800 depicting example operations related to automated network configuration, according to certain embodiments. Sequence diagram 800 includes central control node 112, network element 114₁, and network element 114₂ of FIG. 1. Sequence diagram 800 further includes a configuration component 850, which generally represents a zero touch provisioning (ZTP) server or other type of automatic configuration device or component. For example, configuration component 850 may be a component in network 105 of FIG. 1.

At 802, a neighbor authentication process is performed between network elements 114₁ and 114₂, such as a secure session/channel establishment process described above with respect to FIGS. 5, 6, and/or 7. For example, 802 may be performed after network element 114₂ joins the network as a new node.

In some embodiments, when a new node is discovered through token passing, this discovery triggers a neighbor authentication process. In an example neighbor authentication process, the new node sends its certificate chain to its direct neighbor(s) and each such neighbor verifies the certificate chain against its trust store. The neighbor(s) may send its own certificate chain to the new node, and the new node verifies the neighbor's certificate chain. Both nodes may validate each other's L2 identities (e.g., MAC addresses) against the certificate information.

At block 804, network element 114₁ determines (e.g., based on 802) that it has discovered a new network element, which is network element 114₂. In some embodiments, network element 114₁ discovers network element 114₂ through a token-based topology discovery process and/or based on determining that network element 114₂ can be reached via an interface.

At block 806, network element 114₁ reports the new network element 114₂ to central control node 112 (e.g., in a node reply type token message).

At block 808, central control node 112 sends an initial configuration as well as location information for configuration component 850 to network element 114₁ (e.g., intended for network element 114₂ but being transmitted via network element 114₁ because central control node 112 is not directly connected to network element 114₂). For example, the initial configuration may include values for one or more basic configuration parameters (e.g., the initial configuration may in the form of a configuration template associated with a device type, network position (e.g., in the network topology), and/or other attribute(s) of network element 114₂), and the location information may include an identifier and/or address at which configuration component 850 can be reached by network element 114₂. Communicating the initial configuration as well as location information for configuration component 850 to network element 114₁ (as well as communicating other information as described herein) via the data plane (e.g., via L2 connectivity) allows such information to be transmitted without relying on node internet protocol (IP) and virtual local area network (VLAN) configuration, thereby improving network fault tolerance.

At block 810, network element 114₁ forwards the initial configuration information and configuration component location that was received at block 808 to network element 114₂.

At block 812, network element 114₂ establishes a connection with configuration component 850 based on the location information that it received at block 810. For example, network element 114₂ may send a configuration request (e.g., configuration request type token message) to configuration component 850, such as including a device type, network position, and/or other information about network element 114₂. At block 814, configuration component 850 sends a full configuration to network element $114_2$. For example, configuration component 850 may select a configuration template for network element $114_2$ based on one or more attributes of network element $114_2$ (e.g., device type, network position, and/or the like) that are included in the configuration request, and the full configuration may include the selected configuration template. In certain aspects, the full configuration comprises a comprehensive configuration package for the new node, which may include one or more network policies, one or more security parameters, one or more performance settings, routing information, one or more software and/or firmware updates (if necessary), and/or the like.

At block 816, network element $114_2$ may implement the full configuration, such as setting one or more configuration parameters based on the full configuration from configuration component 850 (and, in some embodiments, based on the initial configuration from central control node 112). In some aspects, network element $114_2$ may perform a self-check in order to confirm proper configuration after installing the full configuration, such as determining whether there are any errors or violations of configuration rules.

At block 818, network element $114_2$ sends a confirmation to configuration component 850, such as confirming receipt and/or implementation of the full configuration.

At block 820, network element $114_2$ sends a network update from network element $114_2$ to network element $114_1$, such as an intermediate stage to transmitting the network update to central control node 112. The network update may, for example, relate to conditions at network element $114_2$ and/or to one or more neighbors of network element $114_2$. At block 822, network element $114_1$ forwards the network update from network element $114_2$ to central control node 112. Central control node 112 may receive the network update and, as appropriate, may update configuration values of one or more nodes based on the network update, such as changing load balancing, routing, and/or the like, and may deploy one or more updated configurations to the one or more nodes accordingly.

Accordingly, techniques described herein involve configuration updates from the central control node that are signed to ensure authenticity. Nodes may then verify the signature before applying any configuration changes. Furthermore, in certain embodiments, configuration data is encrypted during transmission to protect sensitive network information. The comprehensive approach to L2 security described herein provides a robust foundation for protecting network communications from the ground up. By bringing advanced cryptographic techniques and security practices to L2, aspects of the present disclosure significantly enhance network security, addressing vulnerabilities at their root and providing a robust foundation for secure network operations.

Techniques described herein may be used in a variety of networking contexts, such as telecommunications networks (e.g., for enhancing management of large-scale, complex infrastructures), data centers (e.g., for improving efficiency and security in dynamic, high-density environments), internet service providers (ISPs) (e.g., for streamlining network management and service quality assurance), smart cities (e.g., for facilitating management of diverse, interconnected device networks), internet of things (IOT) (e.g., for enabling secure, efficient management of extensive device ecosystems), cloud computing (e.g., for optimizing network infrastructure for reliable service delivery), enterprise networks (e.g., for enhancing security, visibility, and management of corporate infrastructures), industrial control systems (e.g., for improving reliability and security in critical operational environments), and/or the like.

Aspects of the present disclosure provide a variety of benefits, such as a significant reduction in manual network management tasks, enhanced network security at a fundamental level, improved network reliability and performance, reduced operational costs through automation and efficient resource utilization, faster troubleshooting and issue resolution, improved regulatory compliance capabilities, and/or the like.

Techniques described herein represent a paradigm shift in network management and security. By operating at the L2 level and integrating advanced discovery, security, and configuration mechanisms, aspects of the present disclosure provide a comprehensive solution for the challenges faced in network environments. Systems described herein provide the ability to offer real-time visibility, automated management, and enhanced security, positioning such systems as crucial tools for network administrators across various industries. As networks continue to grow in complexity and importance, techniques described herein provide a robust foundation for building more resilient, secure, and efficient network infrastructures.

FIG. 9 is a flow chart depicting example operations 900 related to automated network discovery, according to certain embodiments.

For example, operations 900 may be performed by one or more components described above with respect to FIGS. 1-8. In one embodiment, operations 900 are performed by central control node 112 of FIG. 1.

Operations 900 begin at step 902, with generating and propagating a token containing identity information and a digital signature.

Operations 900 continue at step 904, with receiving neighbor reports from a plurality of network nodes in response to the token. In some embodiments, each neighbor report includes neighbor relationship information, network status information, a device type, and/or a device identifier.

Operations 900 continue at step 906, with constructing and maintaining a network topology based on the received neighbor reports.

In some embodiments, the central control node is further configured to periodically broadcast the token to enable real-time updates of the network topology. In certain embodiments, the central control node is further configured to authenticate new network nodes discovered through the token propagation using pre-installed certificates. In some embodiments, the central control node is further configured to deploy configuration templates to authenticated new network nodes.

In certain embodiments, the network nodes are further configured to initiate a registration process with the central control node upon booting up, reporting their own identity and neighbor node information. In some embodiments, the network nodes are further configured to send departure signaling to the central control node and to corresponding neighbor nodes before disconnecting or before network node departure, allowing the central control node and the corresponding neighbor nodes to update the network topology accordingly. In some embodiments, the corresponding neighbor nodes report received departure signaling to the central control node.

In certain embodiments, the network nodes are further configured to periodically report information, comprising status and neighbor information, to the central control node.

In some embodiments, the central control node is further configured to identify and report topology changes detected through periodic token broadcasting, including potential reasons for the changes.

In certain embodiments, the token comprises a payload section, wherein content of the payload section varies depending on a message type and includes at least one of a device identification, a certificate, a configuration component identifier (e.g., zero touch provisioning server identifier), a configuration template reference, or configuration data.

In some embodiments, the central control node is further configured to leverage existing network protocols for initial configuration component discovery during token exchange.

In certain embodiments, secure communication channels are established through pre-installed certificates and configuration component authentication.

In some embodiments, sensitive information within payloads of the tokens is encrypted to protect configuration data, configuration component identifiers, or device information.

FIG. 10 is a flow chart depicting example operations 1000 related to secure network communications, according to certain embodiments.

For example, operations 1000 may be performed by one or more components described above with respect to FIGS. 1-8. In one embodiment, operations 1000 are performed by central control node 112 of FIG. 1.

Operations 1000 begin at step 1002, with determining that a new node has been added to an L2 network managed by a central control node.

Operations 1000 continue at step 1004, with transmitting, to the new node, a certificate chain of the central control node (e.g., along with the potential intermediate certificates), one or more supported encryption algorithms, ephemeral shared key generation parameters, an ephemeral shared key generation public key of the central control node, and a signature.

Operations 1000 continue at step 1006, with receiving, from the new node, a communication including a corresponding certificate chain of the new node (e.g., along with the potential intermediate certificates), a selected encryption algorithm from the one or more supported encryption algorithms, a corresponding ephemeral shared key generation public key of the new node, and a corresponding signature.

Operations 1000 continue at step 1008, with verifying an authenticity of the communication based on the corresponding certificate chain of the new node and the corresponding signature.

Operations 1000 continue at step 1010, with generating an ephemeral shared key based on the ephemeral shared key generation parameters, the ephemeral shared key generation public key of the central control node, and the corresponding ephemeral shared key generation public key of the new node.

Operations 1000 continue at step 1012, with establishing a secure communication session with the new node based on the selected encryption algorithm and the ephemeral shared key.

In some embodiments, the signature is generated for a given data frame using a private key corresponding to a public key in the certificate chain of the central control node.

In certain embodiments, the corresponding signature is generated for a corresponding data frame using a respective private key corresponding to a corresponding public key in the corresponding certificate chain of the new node.

In some embodiments, the certificate of the central control node comprises an L2 device identifier of the central control node, and the corresponding certificate chain of the new node comprises a corresponding L2 device identifier of the new node. In certain embodiments, the verifying of the authenticity of the communication based on the corresponding certificate chain of the new node and the verification of the corresponding signature is based on a trust store associated with the central control node that stores a root certificate of the new node.

In some embodiments, the verifying of the authenticity of the communication based on the corresponding certificate chain of the new node and the corresponding signature is based further on comparing a source address of the communication to the corresponding L2 device identifier of the new node in the corresponding certificate chain of the new node.

In some embodiments, communications between the central control node and the new node are encrypted using the selected encryption algorithm and the ephemeral shared key and are transmitted via the secure communication channel.

In some embodiments, the new node establishes a corresponding secure communication channel with a different node in the L2 network based on the corresponding certificate chain of the new node and a respective certificate chain of the different node.

In certain embodiments, the ephemeral shared key is a symmetric encryption key.

In some embodiments, the central control node determines that the new node has been added to the L2 network based on generating and propagating a token containing identity information and the signature of the central control node to nodes of the L2 network.

FIG. 11 is a flow chart depicting example operations 1100 related to secure network communications, according to certain embodiments.

For example, operations 1100 may be performed by one or more components described above with respect to FIGS. 1-8. In one embodiment, operations 1100 are performed by central control node 112 of FIG. 1.

Operations 1100 begin at step 1102, with determining, based on a message from a node in a network managed by the central control node, that a new node has been added to the network.

Operations 1100 continue at step 1104, with transmitting, to the new node via the node: one or more configuration parameters for the new node and node type and location information for a configuration component, wherein the node type and location information enables the new node to obtain additional configuration parameters from the configuration component.

In some embodiments, the new node is a neighbor of the node in the network.

In certain embodiments, the central control node determines that the new node has been added to the network or removed from the network based on generating and propagating a token containing identity information and a signature of the central control node to nodes of the network.

In some embodiments, the central control node is further configured to determine the one or more configuration parameters for the new node based on a device type of the new node and a network position of the new node.

In certain embodiments, the new node establishes a secure connection to the configuration component based on the location information, and wherein the configuration component transmits the additional configuration parameters to the new node via the secure connection.

In some embodiments, the configuration component authenticates the new node based on a certificate.

In certain embodiments, the additional configuration parameters comprise one or more of a network policy, a security parameter, a performance setting, routing information, a software update, or a firmware update.

In some embodiments, the configuration component is a zero touch provisioning (ZTP) server. In other embodiments, the configuration component is a different type of configuration component (e.g., other than a ZTP server).

In some embodiments, the transmitting of the one or more configuration parameters for the new node comprises transmitting a configuration template.

FIG. 12 is a diagram 1200 depicting a layer-2 (L2) switch table 390, according to aspects of the present disclosure. Diagram 1200 includes central control node 112 and network elements $114_1$, $114_2$, $114_4$, and $114_5$ of FIG. 1 and interfaces 302, 304, 306, 308, and 350 of FIG. 3.

The L2 switch table 390 on network element $114_1$ includes a list of items, each item representing a corresponding relationship between an "interface" of the current network element and one "other network element" reachable from the interface. The "interface" is the ingress interface learned from the incoming tokens. The "other network element" is learned from the token originated from the other reachable network element. For example, L2 switch table 390 indicates that network element 112 (e.g., central control node 112) is reachable from interface 302, network element $114_4$ is reachable from interface 304, network element $114_5$ is reachable from interface 304, and network element $114_2$ is reachable from interface 308.

It is noted that, in techniques described herein, a "unicast" token may be used send configuration information to a specific network element and report a token to the central control node, while a "broadcast" token may be used for topology discovery.

In an illustrative example, L2 switch table 390 may be learned through the following process. Central control node 112 may send a topology discovery token to network element $114_1$ via interface 302 for dissemination through the network, and network element $114_1$ may receive the token, collect the token source identifier of central control node 112 and related interface 302, create an L2 entry (which is one item in L2 Switch Table 390) that associates interface 302 with central control node 112, and store the L2 entry in L2 Switch Table 390. Network element $114_1$ may send the topology discovery token out via all interfaces, such as including interfaces 304 and 308.

First, network element $114_4$ may reply with a token (e.g., a neighbor report token) via interface 304 to network element $114_1$ (e.g., the token may be directed to central control node 112). Second, network element $114_1$ may receive the token, collect the token source identifier of network element $114_4$ and related interface 304, create an L2 entry (which is one item in L2 Switch Table 390) that associates interface 304 with network element $114_4$, and store the L2 entry in L2 Switch Table 390.

Third, network element $114_5$ may reply with a token (e.g., a neighbor report token) via interface 304 to network element $114_1$ (e.g., the token may be directed to central control node 112, and may be sent from network element $114_5$ via network element $114_4$ and network element $114_1$). Fourth, network element $114_1$ may receive the token, collect the token source identifier of network element $114_5$ and related interface 304, create an L2 entry (which is one item in L2 Switch Table 390) that associates interface 304 with network element $114_5$, and store the L2 entry in L2 Switch Table 390.

L2 switch table 390 may be used for token downstream, such as according to the following illustrative example. First, central control node 112 may send a specific token to network element $114_5$, and the token may reach network element $114_1$. Second, network element $114_1$ may query the position of network element $114_5$ from L2 Switch Table 390 and find interface 304. Third, network element $114_1$ may send the token via interface 304.

L2 switch table 390 may be used for token upstream, such as according to the following illustrative example. First, network element $114_5$ may send a reply token to central control node 112. Second, the token may reach network element $114_4$. Third, network element $114_4$ may forward the token to network element $114_1$ (e.g., according to its own L2 switch table). Fourth, network element $114_1$ may query the position of central control node 112 from L2 Switch Table 390 and find interface 302. Fifth, network element $114_1$ may send the token via interface 302 such that the token may reach central control node 112.

Each node, element, and/or device in the network(s) described herein may comprise and/or may be implemented via one or more computing devices capable of executing software code to perform the processing steps described herein. Such a device may include a processor, memory, interfaces, high-speed expansion ports, and interconnected buses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The present disclosure, in various embodiments, includes components, methods, processes, systems and/or apparatus substantially as depicted and described herein, including various embodiments, sub-combinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

We claim:

1. A system for automated network discovery, comprising:
a central control node implemented via one or more hardware processors configured to:
generate and propagate a token containing identity information and a digital signature;
receive neighbor reports from a plurality of network nodes in response to the token, wherein each neighbor report includes:
neighbor relationship information;
network status information;
a device type; and
a device identifier; and
construct and maintain a network topology based on the received neighbor reports wherein the plurality of network nodes are configured to:
report neighbor relationships to the central control node, including information about directly connected nodes;
initiate a registration process with the central control node upon booting up, reporting their own identity and neighbor node information; and
send departure signaling to the central control node and to corresponding neighbor nodes before disconnecting or network node departure, allowing the central control node and the corresponding neighbor nodes to update the network topology accordingly.

2. The system of claim 1, wherein the central control node is further configured to periodically broadcast the token to enable real-time updates of the network topology.

3. The system of claim 1, wherein the central control node is further configured to authenticate new network nodes discovered through the token propagation using pre-installed certificates.

4. The system of claim 3, wherein the central control node is further configured to deploy configuration templates to authenticated new network nodes.

5. The system of claim 1, wherein the corresponding neighbor nodes report received departure signaling to the central control node.

6. The system of claim 1, wherein the plurality of network nodes are further configured to periodically report information, comprising status and neighbor information, to the central control node.

7. The system of claim 1, wherein the central control node is further configured to identify and report topology changes detected through periodic token broadcasting, including potential reasons for the changes.

8. The system of claim 7, wherein the token comprises a payload section, wherein content of the payload section varies depending on a message type and includes at least one of a device identification, a public key, a certificate, a configuration component identifier, a configuration template reference, or configuration data.

9. The system of claim 1, wherein the central control node is further configured to leverage existing network protocols for initial configuration component discovery during token exchange.

10. The system of claim 1, wherein sensitive information within payloads of the tokens is encrypted to protect configuration data, configuration component identifiers, or device information.

11. A method for automated network discovery, comprising:
generating and propagating a token containing identity information and a digital signature;
receiving neighbor reports from a plurality of network nodes in response to the token, wherein each neighbor report includes:
neighbor relationship information;
network status information;
a device type; and
a device identifier; and
constructing and maintain a network topology based on the received neighbor reports, wherein the plurality of network nodes are configured to:
report neighbor relationships to the central control node, including information about directly connected nodes;
initiate a registration process with the central control node upon booting up, reporting their own identity and neighbor node information; and
send departure signaling to the central control node and to corresponding neighbor nodes before disconnecting or network node departure, allowing the central control node and the corresponding neighbor nodes to update the network topology accordingly.

12. The method of claim 11, further comprising periodically broadcasting the token to enable real-time updates of the network topology.

13. The method of claim 11, further comprising authenticating new network nodes discovered through the token propagation using pre-installed certificates.

14. The method of claim 13, further comprising deploying configuration templates to authenticated new network nodes.

15. A non-transitory computer-readable medium storing instructions that, when executed by one or more processors of a computing system, cause the computing system to:
generate and propagate a token containing identity information and a digital signature;

receive neighbor reports from a plurality of network nodes in response to the token, wherein each neighbor report includes:

neighbor relationship information;

network status information;

a device type; and a device identifier; and construct and maintain a network topology based on the received neighbor reports, wherein the plurality of network nodes are configured to:

report neighbor relationships to the central control node, including information about directly connected nodes;

initiate a registration process with the central control node upon booting up, reporting their own identity and neighbor node information; and send departure signaling to the central control node and to corresponding neighbor nodes before disconnecting or network node departure, allowing the central control node and the corresponding neighbor nodes to update the network topology accordingly.

16. The system of claim 1, wherein secure communication channels are established through pre-installed certificates and configuration component authentication.

* * * * *